(12) United States Patent
Tatsukawa

(10) Patent No.: US 6,259,697 B1
(45) Date of Patent: Jul. 10, 2001

(54) PVC SWITCHING SYSTEM AND PVC SWITCHING METHOD

(75) Inventor: Motoya Tatsukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/026,121

(22) Filed: Feb. 19, 1998

(30) Foreign Application Priority Data

Feb. 19, 1997 (JP) .................................................. 9-034179

(51) Int. Cl.⁷ ........................................................ H04J 3/26
(52) U.S. Cl. ............................................ 370/395; 370/457
(58) Field of Search ............................... 370/218, 221, 370/225, 227, 250, 389, 395, 457, 420; 709/220, 221, 222, 223, 227, 228, 242

(56) References Cited

U.S. PATENT DOCUMENTS

| | | | |
|---|---|---|---|
| 5,029,161 | * 7/1991 | Nagashima | 370/389 |
| 5,067,123 | 11/1991 | Hyodo et al. | 370/58.1 |
| 5,216,669 | 6/1993 | Hofstetter et al. | 370/84 |
| 5,239,537 | 8/1993 | Sakauchi | 370/16 |
| 5,267,232 | 11/1993 | Katsube et al. | 370/17 |
| 5,271,005 | 12/1993 | Takase et al. | 370/79 |

FOREIGN PATENT DOCUMENTS

| | | |
|---|---|---|
| 59-186447 | 10/1984 | (JP) . |
| 63-82143 | 4/1988 | (JP) . |
| 3-230643 | 10/1991 | (JP) . |
| 4-23648 | 1/1992 | (JP) . |
| 6-37809 | 2/1994 | (JP) . |
| 6-85830 | 3/1994 | (JP) . |
| 8-181701 | 7/1996 | (JP) . |

* cited by examiner

*Primary Examiner*—Wellington Chin
*Assistant Examiner*—Frank Duong
(74) *Attorney, Agent, or Firm*—Sughrue, Mion, Zinn, Macpeak & Seas, PLLC (57) ABSTRACT

When switching of PVCs is performed, an administrator performs switching of PVCs systematically and in batch at his/her discretion without affecting communication state of PVCs not subject to switching. A plurality of PVC switching information tables are switched and used. Contents of each entry in tables before and after switching are compared. When there are entries for which contents fail to match, it is to disconnect a connection path indicated by the entry in a table currently used, and to connect a connection path indicated by the entry in a table used after switching. Since this performs no processing on the entries in which contents agree, the administrator can perform PVC switching on connection, disconnection and change of path for parts or all of PVCs in an ATM network in batch and systematically at his/her discretion without affecting communication state of PVCs for which switching connection is not required.

24 Claims, 9 Drawing Sheets

NORMAL MODE TABLE

| EXCHANGE | ORIGINATING PVC INFORMATION | CALLED PVC INFORMATION | ADDITIONAL INFORMATION |
|---|---|---|---|
| 52-3 | C. Lta. 1<br>C. Ltb. 1 | A. Lha. 1<br>B. Lhb. 1 | DEFAULT<br>DEFAULT |
| 52-2 | B. Lhb. 1 | C. Ltb. 1 | DEFAULT |
| 52-1 | A. Lha. 1 | C. Lta. 1 | DEFAULT |

FIG. 7B

FAILURE MODE TABLE

| EXCHANGE | ORIGINATING PVC INFORMATION | CALLED PVC INFORMATION | ADDITIONAL INFORMATION |
|---|---|---|---|
| 52-3 | C. Lta. 1<br>C. Ltb. 1 | B. Lha. 2<br>B. Lhb. 1 | DEFAULT<br>DEFAULT |
| 52-2 | B. Lhb. 1<br>B. Lhb. 2 | C. Ltb. 1<br>C. Lta. 1 | DEFAULT<br>DEFAULT |
| 52-1 | NO ENTRY | NO ENTRY | NO ENTRY |

FIG. 8A

NORMAL MODE TABLE

| EXCHANGE | ORIGINATING PVC INFORMATION | CALLED PVC INFORMATION | ADDITIONAL INFORMATION |
|---|---|---|---|
| 52-3 | C. Lta. 1<br>C. Ltb. 1<br>C. TCA. 1<br>C. TCB. 1 | C. TCA. 1<br>C. TCB. 1<br>C. Lta. 1<br>C. Ltb. 1 | DEFAULT<br>DEFAULT<br>DEFAULT<br>DEFAULT |
| 52-2 | B. TBC. 1<br>B. Lhb. 1 | B. Lhb. 1<br>B. TBC. 1 | DEFAULT<br>DEFAULT |
| 52-1 | A. TAC. 1<br>A. Lha. 1 | A. Lha. 1<br>A. TAC. 1 | DEFAULT<br>DEFAULT |

FIG. 8B

FAILURE MODE TABLE

| EXCHANGE | ORIGINATING PVC INFORMATION | CALLED PVC INFORMATION | ADDITIONAL INFORMATION |
|---|---|---|---|
| 52-3 | C. Lta. 1<br>C. Ltb. 1<br>C. TCB. 2<br>C. TCB. 1 | B. TCB. 2<br>B. TCB. 1<br>C. Lta. 1<br>C. Ltb. 1 | DEFAULT<br>DEFAULT<br>DEFAULT<br>DEFAULT |
| 52-2 | B. TBC. 1<br>B. Ltb. 1<br>B. TBC. 2<br>B. Ltb. 2 | B. Lhb. 1<br>C. TBC. 1<br>C. Ltb. 2<br>C. TBC. 2 | DEFAULT<br>DEFAULT<br>DEFAULT<br>DEFAULT |
| 52-1 | NO ENTRY | NO ENTRY | NO ENTRY |

FIG.9A

NORMAL MODE TABLE

| EXCHANGE | ORIGINATING PVC INFORMATION | CALLED PVC INFORMATION | ADDITIONAL INFORMATION |
|---|---|---|---|
| 62-3 | C. Lt. 1 | D. Lh. 1 | THROUGH EXCHANGE A |
| 62-4 | D. Lh. 1 | C. Lt. 1 | THROUGH EXCHANGE A |
| 62-1 | NO ENTRY | NO ENTRY | NO ENTRY |
| 62-2 | NO ENTRY | NO ENTRY | NO ENTRY |

FIG.9B

FAILURE MODE TABLE

| EXCHANGE | ORIGINATING PVC INFORMATION | CALLED PVC INFORMATION | ADDITIONAL INFORMATION |
|---|---|---|---|
| 62-3 | C. Lt. 1 | D. Lh. 1 | THROUGH EXCHANGE B |
| 62-4 | D. Lh. 1 | C. Lt. 1 | THROUGH EXCHANGE B |
| 62-1 | NO ENTRY | NO ENTRY | NO ENTRY |
| 62-2 | NO ENTRY | NO ENTRY | NO ENTRY |

FIG.10A

NORMAL MODE TABLE

| EXCHANGE | ORIGINATING PVC INFORMATION | CALLED PVC INFORMATION | ADDITIONAL INFORMATION |
|---|---|---|---|
| 6 2 - 3 | C. L t. 1<br>C. T C A. 1 | C. T C A. 1<br>C. L t. 1 | DEFAULT<br>DEFAULT |
| 6 2 - 4 | D. T D A. 1<br>D. L h. 1 | D. L h. 1<br>D. T D A. 1 | DEFAULT<br>DEFAULT |
| 6 2 - 1 | A. T A C. 1<br>A. T A D. 1 | A. T A D. 1<br>A. T A C. 1 | DEFAULT<br>DEFAULT |
| 6 2 - 2 | NO ENTRY | NO ENTRY | NO ENTRY |

FIG.10B

FAILURE MODE TABLE

| EXCHANGE | ORIGINATING PVC INFORMATION | CALLED PVC INFORMATION | ADDITIONAL INFORMATION |
|---|---|---|---|
| 6 2 - 3 | C. L t. 1<br>C. T C B. 1 | C. T C B. 1<br>C. L t. 1 | DEFAULT<br>DEFAULT |
| 6 2 - 4 | D. T D B. 1<br>D. L h. 1 | D. L h. 1<br>D. T D B. 1 | DEFAULT<br>DEFAULT |
| 6 2 - 1 | NO ENTRY | NO ENTRY | NO ENTRY |
| 6 2 - 2 | A. T B C. 1<br>A. T B D. 1 | A. T B D. 1<br>A. T B C. 1 | DEFAULT<br>DEFAULT |

PVC SWITCHING SYSTEM AND PVC SWITCHING METHOD

BACKGROUND OF THE INVENTION

1. Field of the Invention

The present invention relates to a system and method for switching permanent virtual connection (PVC), and, more particularly, to a system and method for controlling switching of PVC in an asynchronous transfer mode (ATM) switching network.

2. Description of the Related Art

Generally, the PVC is a connection path in which an originating terminal and a terminating terminal, or parties to be connected are fixed. When setting of the PVC path or the like is modified, it is necessary to modify setting by individual PVCs to be modified every time modification occurs. Thus, to enhance efficiency of the modification, it is sufficient to previously provide a plurality of settings such as PVC paths, and selectively use one of them.

An example of conventional PVC switching systems is disclosed in Japanese Patent Application Laid-Open No. 4-23648. The PVC switching system disclosed therein is to previously register a plural sets of combinations of connection pairs of PVC in a packet switching network. Then, one set is specified from the registered sets of connection pairs, allowing it to perform communication using the PVC registered in the specified set. When the specification of the set is changed, that is, when the PVC is changed over to another, all PVCs become once unavailable for communication.

A PVC switching system described in Japanese Patent Application Laid-Open No.8-181701 automatically selects the optimum intra-network connection path for PVC in an ATM switching network. That is, each of individual PVCs is monitored for its status, and the optimum path in the network is automatically selected when a failure or the like is detected to change over connection from one PVC to another.

In addition, a PVC switching system described in Japanese Patent Application Laid-Open No. 6-37809 causes one or more changed-over PVCs with priority to correspond to individual PVC logic channels in a packet switching network. In this way, it is possible to attain backup of computer services at multiple points. That is, when switching of PVC is instructed, it is to change over connection of PVC for the PVC logic channel for which switching is necessary for the specified priority. In other words, connection switching control is performed for the PVC logic channel under operation.

The conventional PVC switching system described in Japanese Patent Application Laid-Open No. 4-23648 allows only PVC registered for the selected connection set to perform communication. Thus, it has a disadvantage such that switching on PVC in only part of the network cannot be attained. In addition, even if the same PVC as that prior to switching exists after switching when PVC is switched, that PVC cannot be available for communication for a while.

A conventional PVC switching system described in Japanese Patent Application Laid-Open No. 8-181701 is to automatically select the optimum path in the network for individual PVCs. Therefore, there is a disadvantage that the administrator cannot switch parts or all of PVCs in a batch at his/her discretion.

Furthermore, a conventional PVC switching system described in Japanese Patent Application Laid-Open No. 6-37809 performs switching only for applicable PVCs among PVCs operating according to the specified priority under operation. Thus, there is a disadvantage that the administrator cannot necessarily change connection at his/her discretion.

Therefore, the PVC switching systems in the specifications described above have a disadvantage that, when parts or all of PVCs in the network are connected, disconnected, or changed for paths, the administrator cannot perform switching of them in batch and systematically at his/her discretion without affecting the communication state of PVCs not subject to switching control.

SUMMARY OF THE INVENTION

The present invention is made for overcoming the disadvantages of the prior art, and intended to provide a method and system for switching PVCs in which, when parts or all of PVCs in the ATM network are connected, disconnected, or changed for paths, the administrator can perform switching of them in batch and systematically at his/her discretion without affecting the communication state of PVCs not subject to switching control.

The PVC switching system according to the present invention is a PVC switching system for selectively using one of PVC information tables as a current table, and connecting an originating terminal and a terminating terminal according to content of the current table, each of the PVC information tables being recorded with originating and terminating correspondence information, the information containing information for identifying a originating terminal and a terminating terminal for each of those subject to switching of a plurality of PVCs, each of PVC being a connection path fixed with an originating terminal and a terminating terminal, wherein the system comprises comparison means,in response to a switching command for comparing content of each entry in the current table and those in a table used after switching, and connection control means for, when there are entries for which the result of the comparison fails to match, disconnecting the connection path indicated by the entries, and connecting a connection path indicated by the entries in the table used after switching.

In summary, the present invention compares contents of each entry in a table before and after switching, if there is an entry in which contents do not agree, disconnects a connection path indicated by the entry in a table currently used, and connects a connection path indicated by the entry in a table being used after switching. Since this performs no processing on the entries in which contents agree, the administrator can perform PVC switching on connection, disconnection and change of path for parts or all of PVCs in an ATM network in batch and systematically at his/her discretion without affecting communication state of PVCs for which switching connection is not required.

DESCRIPTION OF THE PREFERRED EMBODIMENT

Now, an embodiment of the present invention is described with reference to the drawings.

Figure 1:
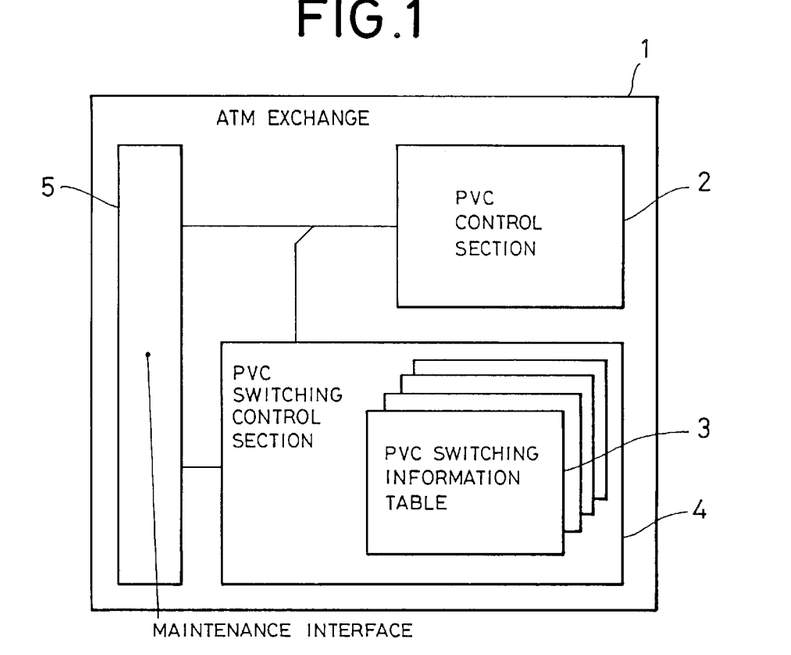
FIG. 1 is a block diagram showing the arrangement of an ATM exchange using a PVC switching system according to an embodiment of the present invention.

FIG. 1 is a block diagram showing an arrangement when the PVC switching system according to the present invention is applied to an ATM exchange for building an ATM switching network. The figure shows the internal arrangement of the ATM exchange for building the ATM switching network which provides PVC services.

In the figure, each ATM exchange 1 comprises a PVC control section 2 for controlling each of PVCs, a PVC switching control section 4 for instructing the PVC control section 2 to control each PVC based on PVC setting information in an internal PVC switching information table 3, and a maintenance interface 5 for performing connection with a maintenance terminal in an ATM switching network.

The PVC control section 2 is connected to the maintenance interface 5 for instructing setting of each PVC from a maintenance terminal, not shown. The PVC switching control section 4 is connected to the maintenance terminal 5 for deleting registration of the PVC setting information for the PVC switching information table 3 from the maintenance terminal, not shown. In addition, the PVC switching control section 4 is connected to the maintenance interface 5 for specifying one of the PVC switching information tables 3 from the maintenance terminal, not shown.

The PVC switching control section 4 has a plurality of PVC switching information tables 3 in which one or more PVC setting information are registered. Then, the PVC switching control section 4 compares contents of each entry in the PVC switching information tables 3 being in use when switching is instructed (being currently used) and those in the PVC switching information tables 3 being used after switching. That is, the contents of each entry in the PVC switching information table 3 are compared before and after switching. As the result of comparison, setting is instructed from a PVC to another only for unmatched entries, or only PVCs for which setting information is modified. Thus, the PVC switching control section 4 is also connected to the PVC control section 2, thereby instructing the PVC control section 2 to perform setting.

Registration or deletion of registration is performed by means of PVC switching information table 3 for the PVC setting information through the maintenance interface from the maintenance terminal, not shown. In addition, when one of the PVC switching information tables 3 is specified for the PVC switching control section 4 from the maintenance terminal, not shown, through the maintenance interface, the PVC switching control section 4 compares the PVC switching information tables 3 before and after switching is instructed. Then, PVC setting information is produced from a PVC to another only for PVCs for which the comparison reveals modification of setting information, whereby PVC control is instructed for the PVC control section 2.

Thus, the administrator can perform PVC switching in batch and systematically at his/her discretion only for PVCs previously registered in the specified PVC switching information table 3. At the same time, there is no influence on the communication state of PVCs for which modification is not necessary for the connection state of PVC, or which is not related to switching. In this case, switching can be performed for parts of PVCs in the network by separately setting for PVCs not relating to switching for the PVC control section 2 from the maintenance terminal. In addition, switching is performed for all PVCs in the network by not performing setting of PVC for the PVC control section from the maintenance terminal.

As such, according to the system, the administrator can perform PVC switching on connection, disconnection and change of path for parts or all of PVCs in an ATM network in batch and systematically at his/her discretion without affecting communication state of PVCs for which switching control is not required.

Figure 2:
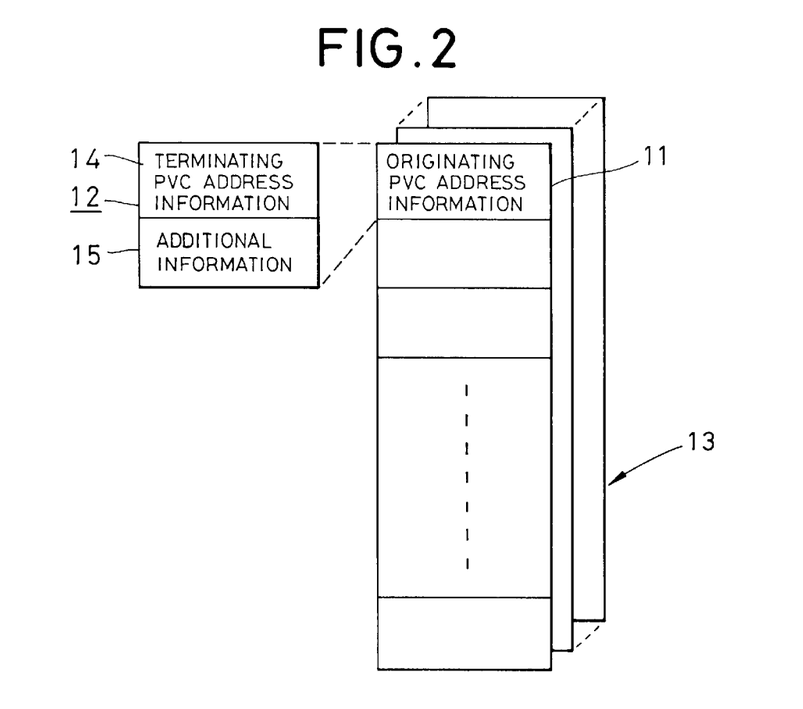
FIG. 2 is an example of arrangement of the PVC switching information table in FIG. 1.

FIG. 2 is an example of internal arrangement of the PVC switching information table 3 of the PVC switching system in FIG. 1. In FIG. 2, the PVC switching information table 3 is arranged to contain a plurality of PVC information tables 13. Each of the PVC information tables 13 is arranged to contain a plurality of PVC setting information 12 with originating PVC address information 11 as an index. Then, each PVC setting information 12 consists of terminating PVC address information 14 and additional information 15.

The originating PVC address information 11 is identification information (phone number or the like) for identifying an originating terminal. In addition, the terminating PVC address information 14 is identification information (phone number or the like) for identifying a terminating terminal. Furthermore, the additional information 15 is information for identifying a band or path.

Now, the operation of PVC switching system according to the embodiment is described.

First, operation is described for setting a PVC which does not require switching control of PVC. When setting a PVC not requiring switching control of PVC, a PVC control command with the PVC setting information as an element is transmitted from a maintenance terminal, not shown, to the PVC control section 2 through the maintenance interface 5. This causes the PVC control section 2 to control a PVC according to the received PVC setting information for connecting or disconnecting a PVC.

Next, operation is described for setting the PVC setting information 12 to the PVC switching information table 3. The PVC setting information 12 is set as follows. First, specified are a specific PVC setting information table 13 and originating PVC address 11 in the PVC switching information table 3. At the same time, a PVC switching information setting command with the terminating PVC address information 14 and the additional information 15 as elements is transmitted from the maintenance terminal to the PVC switching control section 4 through the maintenance interface 5.

The PVC switching control section 4 responsive to the transmission sets each of received elements to the terminating PVC address information 14 and the additional information 15 of the PVC setting information 12 with as an index the originating PVC address information in the specified PVC setting information table 13.

Figure 3:
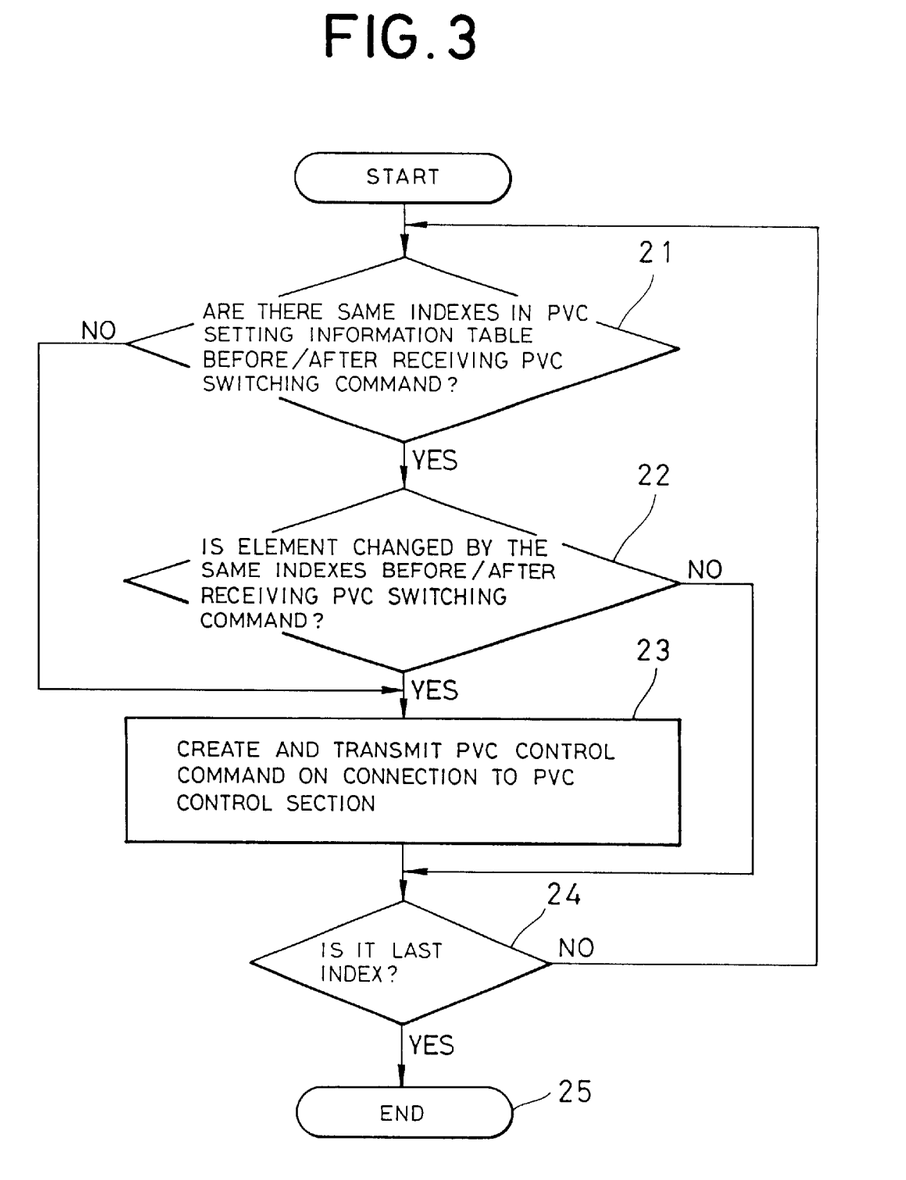
FIG. 3 is a flowchart illustrating operation for adding and changing registration by the PVC switching control section in FIG. 1.

Then, the operation of the system is described for switching PVCs with reference to FIG. 3. First, a PVC switching command is transmitted from a maintenance terminal, not shown, to the PVC switching control section 4 through a maintenance terminal interface 5, the PVC switching command having as an element only information specifying a specific PVC setting information table 13 in the PVC switching information table 3. Then, the PVC switching control section 4 performs processing on addition of a new PVC and change of existing PVC setting.

At the moment, the PVC switching control section 4 checks whether or not there exists the index same as the index indicating the originating PVC address information 11 at the top of the PVC setting information table 13 specified by the PVC switching command in a PVC information table 13 which is current when the PVC switching command is received (step 21). If the same index does not exist, the PVC switching control section 4 creates a PVC control command on a PVC connection from the originating PVC address information 11 on the investigated index in the PVC setting information table 13 specified by the PVC switching command, as well as terminating PVC address information 14 and additional information 15 in the corresponding PVC setting information 12, and transmits the thus created PVC control command to the PVC control section 2 (step 21→23).

On the other hand, if the same index exists, the PVC switching control section 4 checks whether or not there is any modification in the terminating PVC address information 14 and the additional information 15 of the PVC setting information 12 with the existing index (step 21→22). If each information is modified, the PVC switching control section 4 creates a PVC control command on a PVC connection from the originating PVC address information 11 on the investigated index in the PVC setting information table 13 specified by the PVC switching command, as well as terminating PVC address information 14 and additional information 15 in the corresponding PVC setting information 12, and transmits it to the PVC control section 2 (step 22→23). If there is no modification in each information, the process of step 23 is not performed.

The PVC switching control section 4 repeats the above operation up to the last index (step 24→21 . . . ). That is, the PVC switching control section 4 performs a similar operation on an index indicating the next originating PVC address information 11 of the PVC setting information table 13 specified by the PVC switching command. If there is no next index, that is, if process on the last index completes (step 24→25), the process proceeds to a process on disconnection of PVC.

Figure 4:
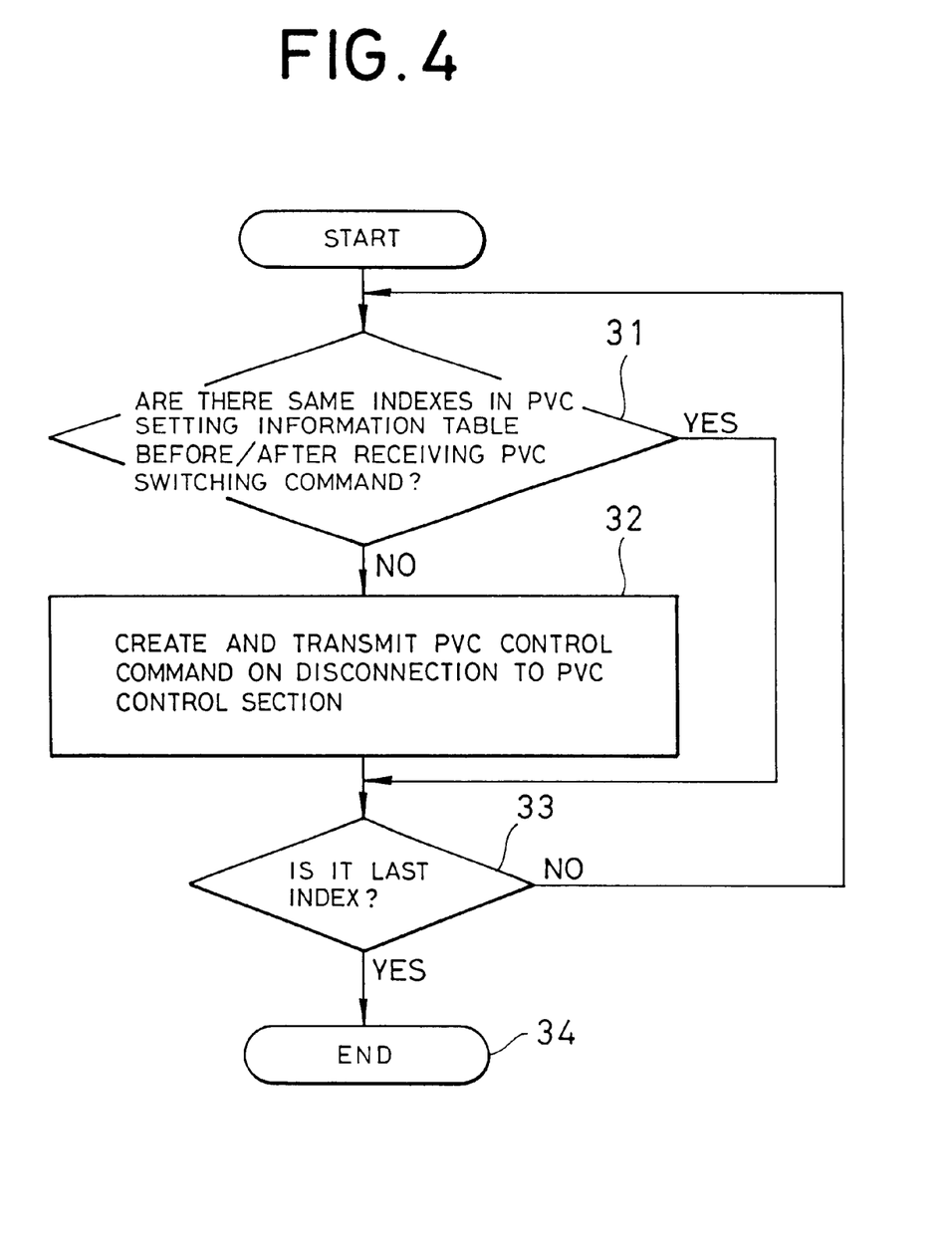
FIG. 4 is a flowchart illustrating operation for disconnecting a PVC by the PVC switching control section in FIG. 1.

Next, description is given on the disconnection process with reference to FIG. 4.

As shown in FIG. 3, when the process completes for addition of a new PVC and change of existing PVC setting, the PVC switching control section 4 checks whether or not there exists the index same as the index indicating the originating PVC address information 11 at the top of the PVC setting information table 13 which is current when the PVC switching command is received in the PVC information table 13 specified by the PVC switching command (step 31).

If the same index does not exist, the PVC switching control section 4 creates a PVC control command on PVC disconnection from the originating PVC address information 11 on the investigated index in the PVC setting information table 13 which is current when the PVC switching command is received, as well as the terminating PVC address information 14 and additional information 15 in the corresponding PVC setting information 12, and transmits it to the PVC control section 2 (step 31→32). On the other hand, if the same index exists, the process of step 32 is not performed.

The PVC switching control section 4 repeats the above operation up to the last index (step 33→31 . . . ). That is, the PVC switching control section 4 performs a similar operation on an index indicating the next originating PVC address information 11 of the PVC setting information table 13 which is current when the PVC switching command is received. If there is no next index, that is, if process on the last index completes, the process on PVC disconnection completes (step 33→34).

When the PVC control section 2 receives the PVC control command from the PVC switching control section 4, it performs PVC control similar to that by the PVC control command received through the maintenance interface 5.

As described above, the system comprises, in each ATM exchange constituting an ATM switching network providing PVC services, a PVC control section 2 for performing control on PVC basis, a PVC switching control section 4 having a plurality of PVC switching information tables 3 in which one or more PVC setting information are registered and instructing the PVC control section 2 to control the PVC on individual PVC bases based on the PVC setting information of the PVC switching information table 3 , and a maintenance interface 5 for attaining connection with a maintenance terminal, not shown, for the ATM switching network.

Then, the PVC control section 2 performs control setting information on PVC basis instructed from the maintenance terminal through the maintenance interface 5. Thus, the administrator can individually set PVCs in batch and systematically at his/her discretion for which switching is not required. In addition, registration of an entry for PVC setting information 12 in the PVC setting information tables 3 can be deleted by an instruction from the maintenance terminal through the maintenance interface 5.

When one of the PVC setting information tables is specified from the maintenance terminal through the maintenance interface 5, the PVC switching control section 4 compares the current table with a table for which switching is instructed (a table becoming a new current table) for their contents, creates PVC setting information for a PVC for which the setting information is modified on individual PVC basis, and instructs the PVC control section 2 to control the PVC. Thus, the administrator can switch PVCs in batch and systematically at his/her discretion for those PVCs which are previously registered in the specified PVC switching information table 3.

During this PVC switching process, there is no influence on communication state of PVCs for which connection state of PVC is not changed, or which has no relation with switching. In this case, the PVC switching can be performed for a part of network by individually setting PVCs not relating to the switching for the PVC control section 2 from the maintenance terminal. At the same time, switching can be performed for all PVCs in the network by not setting PVC for the PVC control section 2 from the maintenance terminal at all.

As described above, according to the system, the administrator can perform in batch and systematically at his/her discretion PVC switching of connection, disconnection, and change of path for parts or all of PVCs in the ATM network without affecting communication state of PVCs for which no switching control is required.

Figure 5A:
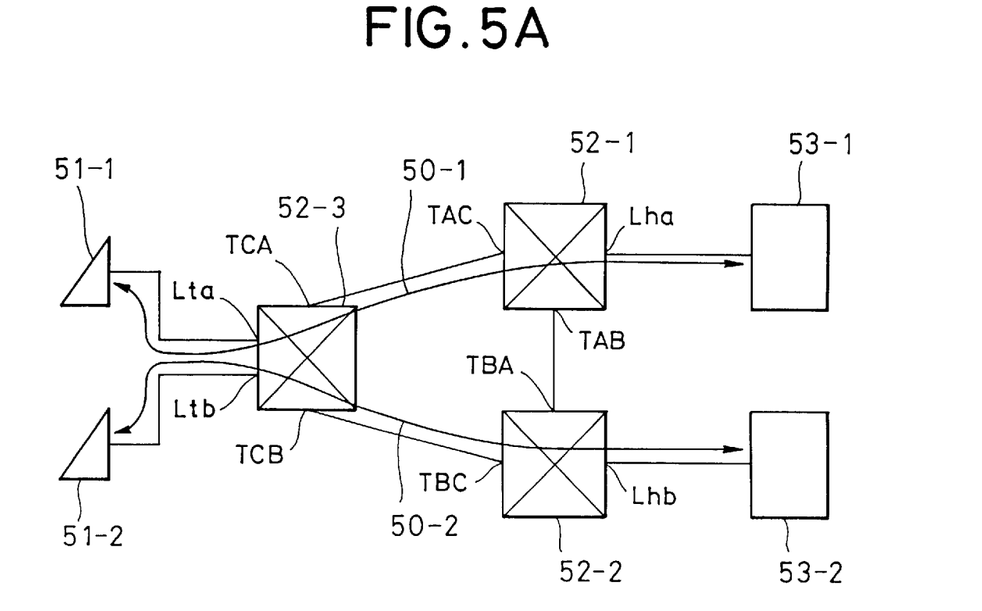
FIG. 5A is a block diagram showing a path of PVC in a normal mode of the ATM switching network using the ATM exchange of FIG. 1.
Figure 5B:
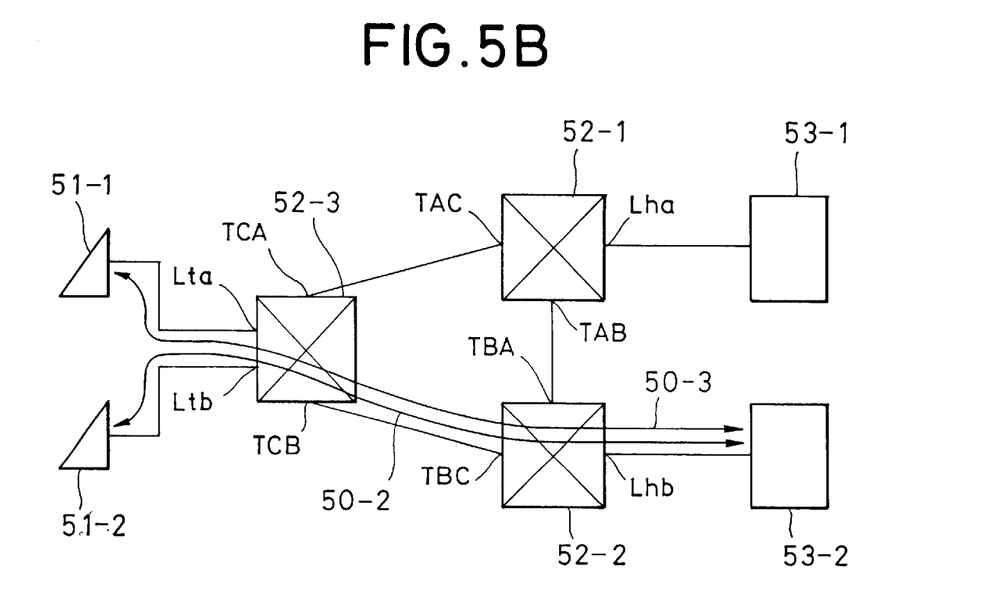
FIG. 5B is a block diagram showing a path of PVC in a failure mode of the ATM switching network using the ATM exchange of FIG. 1.
Figure 6A:
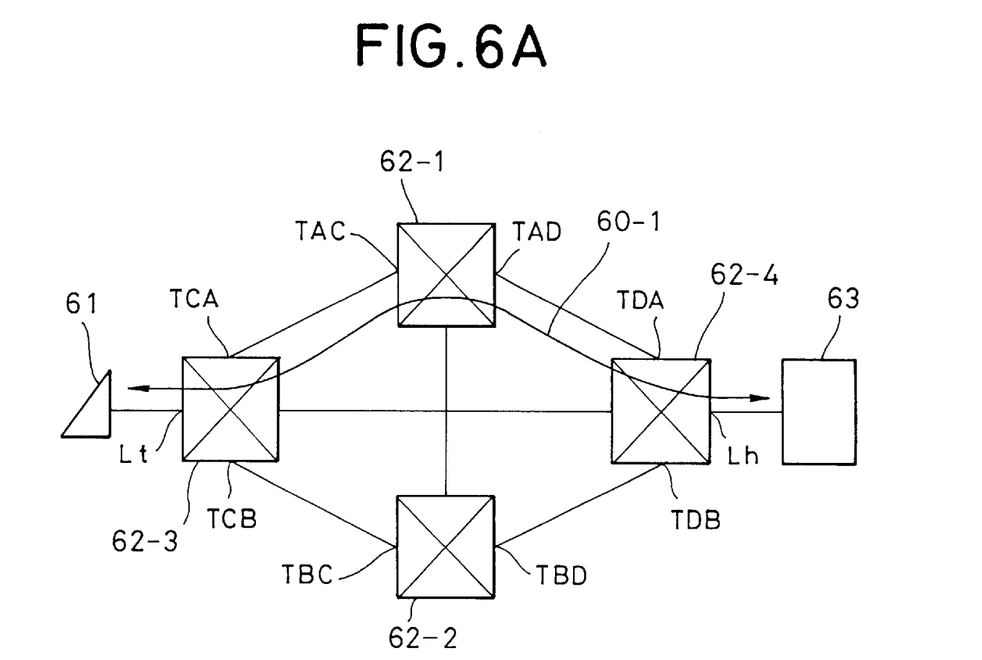
FIG. 6A is a block diagram showing a path of PVC in a normal mode of the ATM switching network using the ATM exchange of FIG. 1.
Figure 6B:
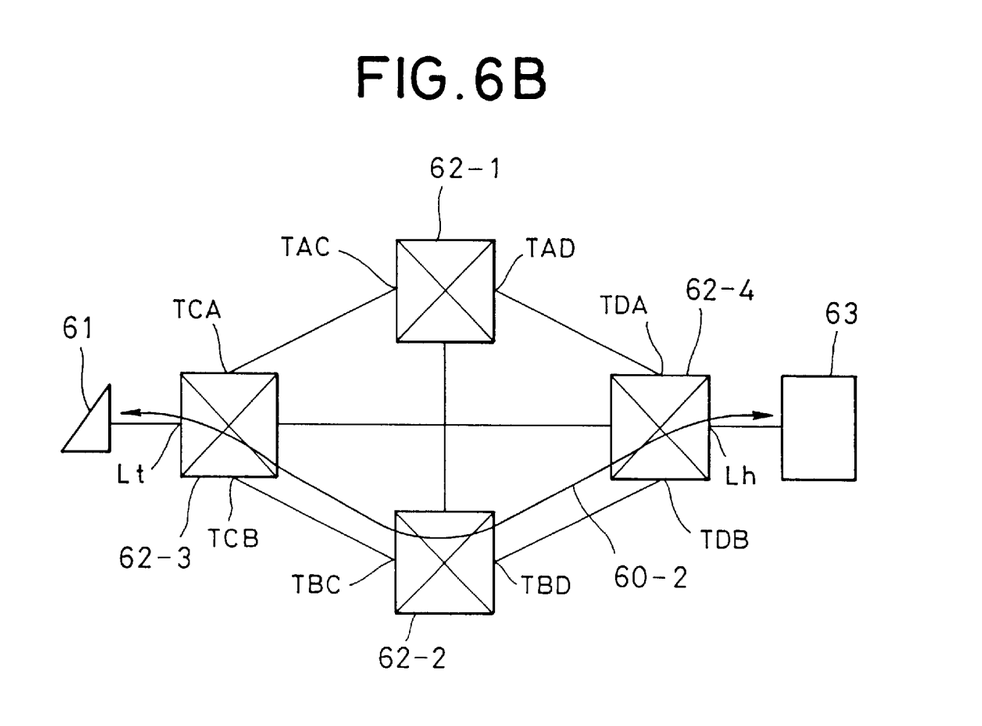
FIG. 6B is a block diagram showing a path of PVC in a failure mode of the ATM switching network using the ATM exchange of FIG. 1.

Description is given on an example of building an ATM network using the above ATM exchange with reference to FIGS. 5 and 6.

FIG. 5 shows an ATM network built by using three ATM exchanges. FIG. 5A shows a path of PVC in a normal mode, while FIG. 5B shows a path of PVC in the failure mode.

As shown in FIG. 5A, a terminal 51-1 transmits and receives data through connection with a host 53-1 by a PVC 50-1 through ATM exchanges 52-3 and 52-1. On the other hand, a terminal 51-2 transmits and receives data through connection with a host 53-2 by a PVC 50-2 through ATM exchanges 52-3 and 52-2. In this case, in each of ATM exchanges 52-1 –52-3, a PVC table is current, which contains originating PVC information and terminating PVC information which are contents for forming the PVC shown in the figure, as well as additional information.

In such normal mode, when failure occurs in the host 53-1, a current PVC information table in the ATM exchange 52-3 is switched to another table. This switching causes the failure mode shown in FIG. 5B.

That is, the terminal 51-1 would be connected to the host 53-2 by a PVC 50-3 through the ATM exchanges 52-2 and 52-3. As such, switching from the PVC 50-1 to the PVC 50-3 enables the terminal 51-1 to continue transmission or receiving of data or the like. Then, such switching does not affect the PVC 50-2 not relating to the switching operation, and the terminal 51-2 can continue transmission or receiving of data or the like with the host 53-2 without experiencing disconnection of line.

In addition, FIG. 6 shows an ATM network constructed using four ATM exchanges. FIG. 6A shows a path of PVC in a normal mode, while FIG. 6B shows a path of PVC in a failure mode.

As shown in FIG. 6A, a terminal 61 transmits and receives data through connection with a host 63 by a PVC 60-1 through ATM exchanges 62-3, 62-1 and 62-4. In this case, in each of ATM exchanges 62-1, 62-3 and 62-4, a PVC information table is current, which contains originating PVC information and terminating PVC information which are contents for forming the PVC shown in the figure, as well as additional information.

In such normal mode, when failure occurs in the host 62-1, the current PVC information tables of the ATM exchanges 62-3 and 62-4 are switched to other tables. This switching causes the failure mode shown in FIG. 6B.

That is, the terminal 61 would be connected to the host 63 by a PVC 60-2 through the ATM exchanges 62-3, 62-2 and 62-4. As such, switching from the PVC 60-1 to the PVC 60-2 enables the terminal 61 to continue transmission and receiving of data or the like.

In this case, a PVC may be anticipated, which directly connects to the ATM exchange 62-4 from the ATM exchange 62-3 without through the ATM exchange 62-1 or 62-2. However, because of relationship between line capacity and traffic capacity, or the like, there may be a case where only either one of PVC 60-1 or PVC 60-2 is desired to be used. Even in such case, the administrator can systematically switch PVCs at his/her discretion by providing a PVC information table which is contents for forming the PVC 60-2, and a PVC information table which is contents for forming the PVC 60-2 in the ATM exchanges 62-3 and 62-4, respectively, and switching and using these tables.

Now, more detailed description is given with reference to FIGS. 7–10 on the PVC switching information table used in the normal and failure modes shown in FIGS. 5 and 6. When a PVC switching information table is constructed, two approaches may be anticipated. An approach is to register PVCs in an originating exchange and to automatically select a path in the network (hereinafter called "software PVC"). Another approach is to register PVCs in individual exchanges.

First, a case is described in which the state of FIG. 5A is switched to the state of FIG. 5B.

Figure 7A:
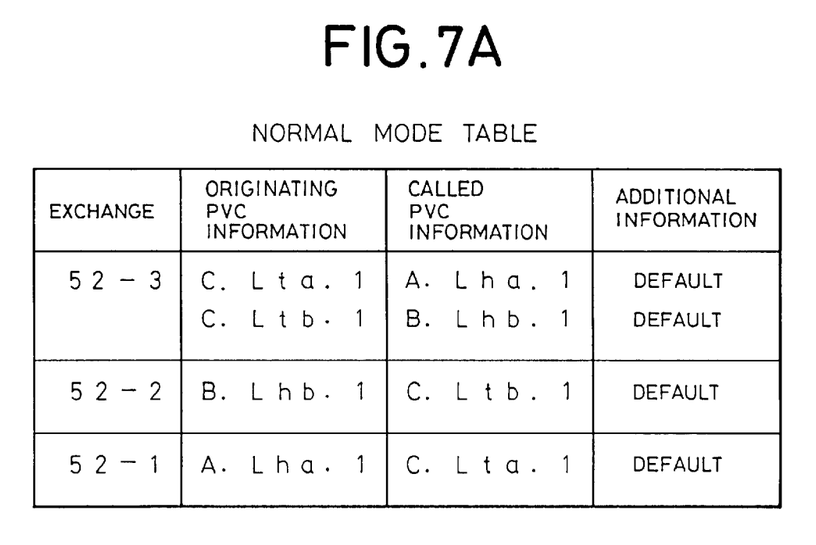
FIG. 7A is contents of a PVC switching information table in the normal mode of FIG. 5A of contents of the PVC switching information table in the case of software PVC.

First, in the case of software PVC, a table shown in FIG. 7A is used for the normal mode (state of FIG. 5A). Referring to FIG. 7A, the PVC switching information table in the exchange 52-3 (Exchange C) is registered with correspondence between originating PVC information "C. Lta. 1" and called PVC information "A. Lha. 1," as well as correspondence between originating PVC information "C. Ltb. 1" and called PVC information "B. Lhb. 1." In addition, the PVC switching information table in the exchange 52-2 (Exchange B) is registered with correspondence between originating PVC information "B. Lhb. 1" and called PVC information "C. Ltb.1." Furthermore, the PVC switching information table in the exchange 52-1 (Exchange A) is registered with correspondence between originating PVC information "A. Lha. 1" and called PVC information "C. Lta. 1." All additional information are of default values.

Figure 7B:
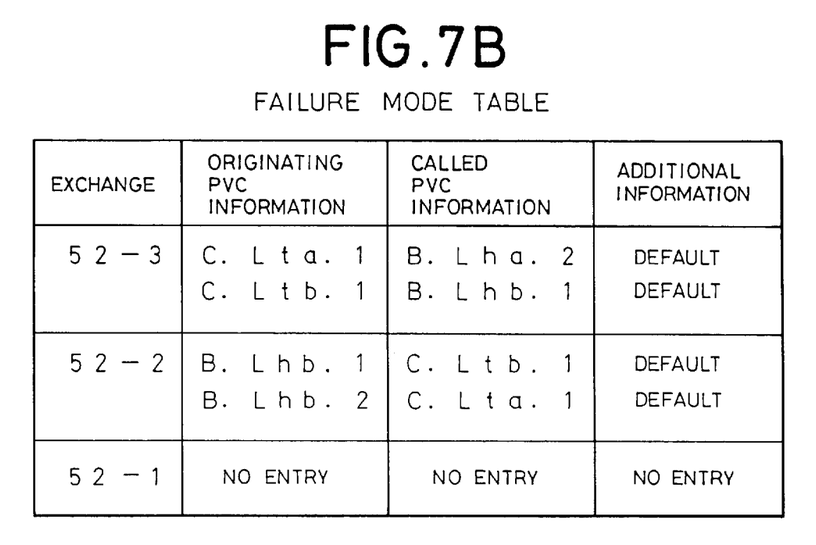
FIG. 7B is contents of a PVC switching information table in the failure mode of FIG. 5B of contents of the PVC switching information table in the case of software PVC.

In FIG. 7, "Lta," "Ltb," "Lha," and "Lhb" in the originating and called PVC information correspond to respective terminals of respective exchanges in FIG. 5. The operation of normal mode is implemented with such contents of registration, whereby PVCs 50-1 and 50-2 in FIG. 5A are formed.

On the other hand, a table shown in FIG. 7B is used for the failure mode (state of FIG. 5B). Referring to FIG. 7B, the PVC switching information table in the exchange 52-3 (Exchange C) is registered with correspondence between originating PVC information "C. Lta. 1" and called PVC information "B. Lha. 2," as well as correspondence between originating PVC information "C. Ltb. 1" and called PVC information "B. Lhb. 1." In addition, the PVC switching information table in the exchange 52-2 (Exchange B) is registered with correspondence between originating PVC information "B. Lhb. 1" and called PVC information "C. Ltb. 1," as well as correspondence between originating PVC information "B. Lhb. 2" and called PVC information "C. Lta. 1." The PVC switching information in the exchange 52-1 (Exchange A) has no entry.

The operation of failure mode is implemented with such contents of registration, whereby PVCs 50-2 and 50-3 in FIG. 5B are formed. In summary, the PVC switching information table shown in FIG. 7A is used in the normal operation, while the PVC switching information table shown in FIG. 7B is used in response to occurrence of failure. Then, when the tables are switched, the contents in both table are compared each other, and registration, addition or deletion of PVC as described above is performed for those entries which fail to match.

For example, in FIG. 7A, correspondence in the exchange 52-3 between the originating PVC information "C. Lta. 1" and the called PVC information "A. Lha. 1" is registered in the PVC switching information table of the exchange 52-3, while, in FIG. 7B, correspondence between the originating PVC information "C. Lta. 1" and the called PVC information "B. Lha. 2" is registered in the PVC switching information table of the exchange 52-3. Accordingly, since the called PVC information fails to match, registration and deletion of PVCs are performed.

In addition, correspondence between the originating PVC information "B. Lhb. 2" and the called PVC information "C. Lta. 1," which is not registered in FIG. 7A is registered in the PVC switching information table for the exchange 52-2 in FIG. 7B. Accordingly, a PVC is added with the correspondence between the originating PVC information "B. Lhb. 2" and the called PVC information "C. Lta. 1."

Furthermore, the correspondence between the originating PVC information "A. Lha. 1" and the called PVC information "C. Lta. 1," which is registered in FIG. 7A is not registered in FIG. 7B. Accordingly, a PVC is deleted with the correspondence between the originating PVC information "A. Lha. 1" and the called PVC information "C. Lta. 1"

In this case, the PVC 50-2 is not affected at all, communication is interrupted between the terminal 51-2 and the host 53-2.

Figure 8A:
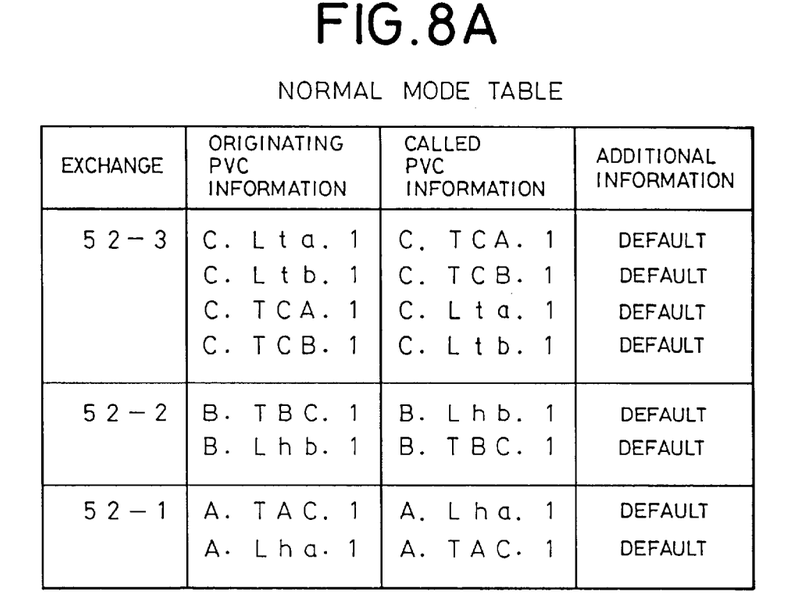
FIG. 8A is contents of a PVC switching information table in the normal mode of FIG. 5A of contents of the PVC switching information table when PVC is registered by individual exchanges.

Then, when PVCs are registered in individual exchanges, a table shown in FIG. 8A is used in the normal mode (state shown in FIG. 5A). Referring to FIG. 8A, the PVC switching information table in the exchange 52-3 (Exchange C) is registered with correspondence between originating PVC information "C. Lta. 1" and called PVC information "C. TCA. 1," correspondence between originating PVC information "C. Ltb. 1" and called PVC information "C. TCB. 1, "correspondence between originating PVC information "C. TCA. 1" and called PVC information "C. Lta. 1," as well as correspondence between originating PVC information "C. TCB. 1" and called PVC information "C. Ltb. 1." In addition, the PVC switching information table in the exchange 52-2 (Exchange B) is registered with correspondence between originating PVC information "B. TBC. 1" and called PVC information "B. Lhb. 1," as well as correspondence between originating PVC information "B. Lhb. 1" and called PVC information "B. TBC. 1." Furthermore, the PVC switching information table in the exchange 52-1 (Exchange A) is registered with correspondence between originating PVC information "A. TAC. 1" and called PVC information "A. Lha. 1," as well as correspondence between originating PVC information "A. Lha. 1" and called PVC information "A. TAC. 1." All additional information are of default values.

Figure 8B:
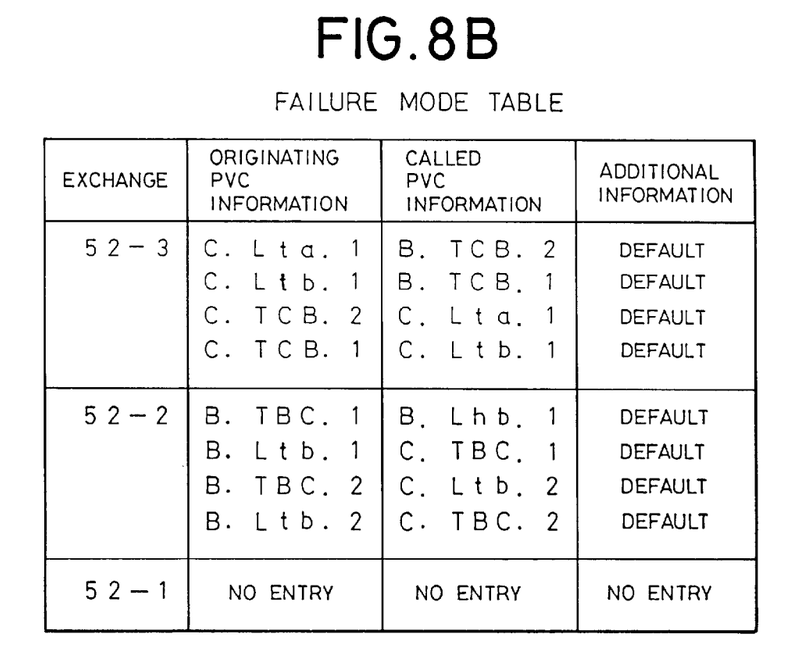
FIG. 8B is contents of a PVC switching information table in the failure mode of FIG. 5B of contents of the PVC switching information table when PVC is registered by individual exchanges.

In FIG. 8, "Lta," "Ltb," "Lha," "Lhb," "TAC," "TCA," " TBC," and "TCB" in the originating and called PVC information correspond to respective terminals of respective exchanges in FIG. 5. The operation of normal mode is implemented with such contents of registration, whereby PVCs 50-1 and 50-2 in FIG. 5A are formed.

On the other hand, a table shown in FIG. 8B is used for the failure mode (state of FIG. 5B). Referring to the figure, the PVC switching information table in the exchange 52-3 (Exchange C) is registered with correspondence between originating PVC information "C. Lta. 1" and called PVC information "B. TCB. 2," correspondence between originating PVC information "C. Ltb. 1" and called PVC information "B. TCB. 1," correspondence between originating PVC information "C. TCB. 2" and called PVC information "C. Lta. 1," as well as correspondence between originating PVC information "C. TCB. 1" and called PVC information "C. Ltb. 1." In addition, the PVC switching information table in exchange 52-2 (Exchange B) is registered with correspondence between originating PVC information "B. TBC. 1" and called PVC information "B. Lhb. 1," correspondence between originating PVC information "B. Ltb. 1" and called PVC information "C. TBC. 1," correspondence between originating PVC information "B. TBC. 2" and called PVC information "C. Ltb. 2," as well as correspondence between originating PVC information "B. Ltb. 2" and called PVC information "C. TBC. 2." The PVC switching information in the exchange 52-1 (Exchange A) has no entry.

The operation of failure mode is implemented with such contents of registration, whereby PVCs 50-2 and 50-3 in FIG. 5B are formed. In summary, the PVC switching information table shown in FIG. 8A is used in the normal operation, while the PVC switching information table shown in FIG. 8B is used in response to occurrence of failure. Then, when the tables are switched, the contents in both tables are compared each other, and registration, addition or deletion of PVC as described above is performed for those entries which fail to match.

Now, description is given in a case where the state of FIG. 6A is switched of the state of FIG. 6B.

Figure 9A:
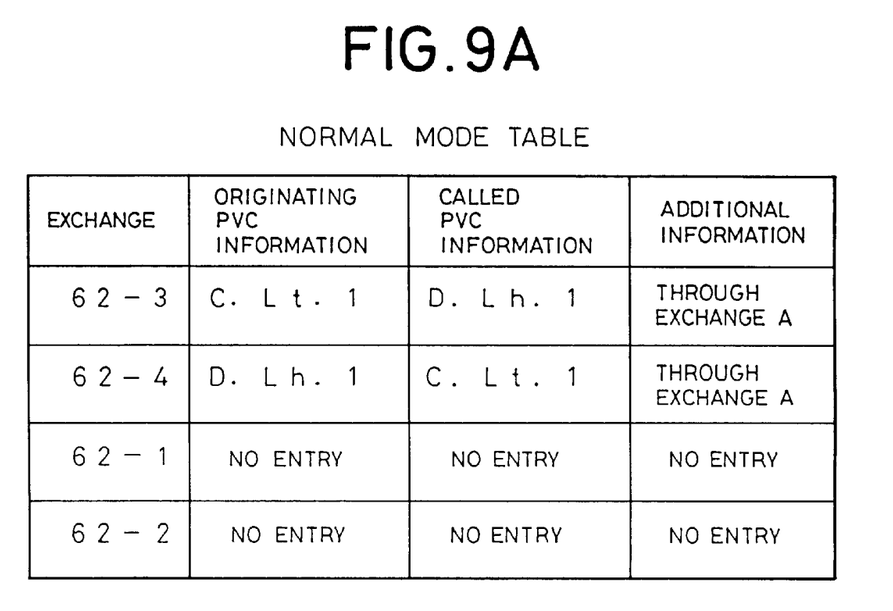
FIG. 9A is contents of a PVC switching information table in the normal mode of FIG. 6A in the case of software PVC.

First, in the case of software PVC, a table shown in FIG. 9A is used for the normal mode (state of FIG. 6A). Referring to FIG. 9A, the PVC switching table in the exchange 62-3 (Exchange C) is registered with correspondence between originating PVC information "C. Lt. 1" and called PVC information "D. Lh. 1." In this case, the additional information is "through Exchange A." In addition, the PVC switching information in the exchange 62-4 (Exchange D) is registered with correspondence between originating PVC information "D. Lh. 1" and called PVC information "C. Lt. 1." In this case, the additional information is "through Exchange A." There is no entry in the PVC switching tables in the exchanges 62-2 and 62-1 (Exchanges B and A).

Figure 9B:
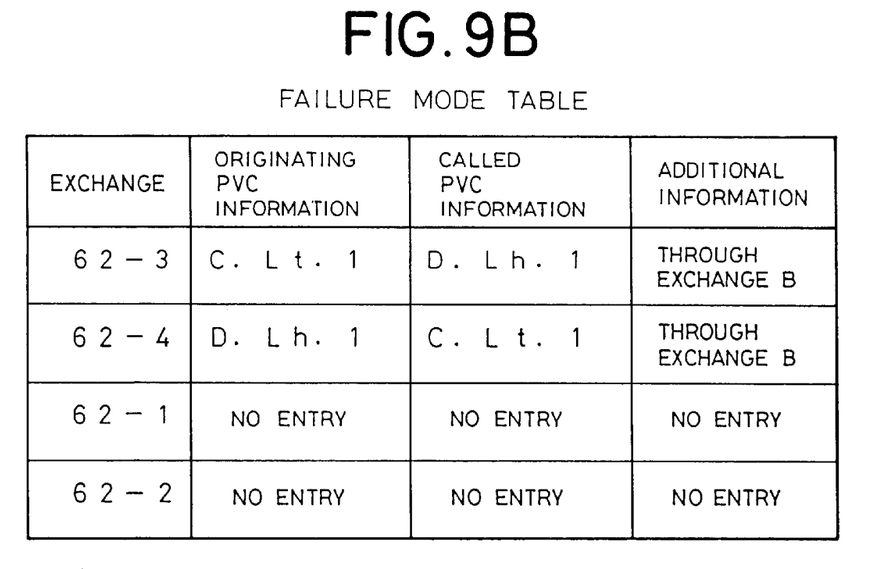
FIG. 9B is contents of a PVC switching information table in the failure mode of FIG. 6B in the case of software PVC.

In FIG. 9, "Lt" and "Lh" correspond to respective terminals of respective exchanges in FIG. 6. The operation of normal mode is implemented with such contents of registration, whereby the PVC 60-1 in FIG. 6A is formed.

On the other hand, a table shown in FIG. 9B is used for the failure mode (state of FIG. 6B). Referring to FIG. 9B, the PVC switching information table in the exchange 62-3 (Exchange C) is registered with correspondence between originating PVC information "C. Lt. 1" and called PVC information "D. Lh. 1." In this case, the additional information is "through Exchange B." In addition, the PVC switching information table in the exchange 62-4 (Exchange D9) is registered with correspondence between originating PVC information "D. Lh. 1" and called PVC information "C. Lt. 1." In this case, the additional information is "through Exchange B." There is no entry in the PVC switching tables in the exchanges 62-2 and 62-1 (Exchanges B and A).

The operation of failure mode is implemented with such contents of registration, whereby the PVC 60-2 in FIG. 6B is formed. In summary, the PVC switching information table shown in FIG. 9A is used in the normal operation, while the PVC switching information table shown in FIG. 9B is used in response to occurrence of failure. Then, when the tables are switched, the contents in both table are compared each other, and registration, addition or deletion of PVC as described above is performed for those entries which fail to match.

That is, "through Exchange A" is registered as the additional information for both the exchanges 62-3 and 62-4 in FIG. 9A, while "through Exchange B" is registered as the additional information for both the exchanges 62-3 and 62-4. Accordingly, since the additional information fails to match, the PVC 60-2 is registered, and the PVC 60-1 is deleted.

Figure 10A:
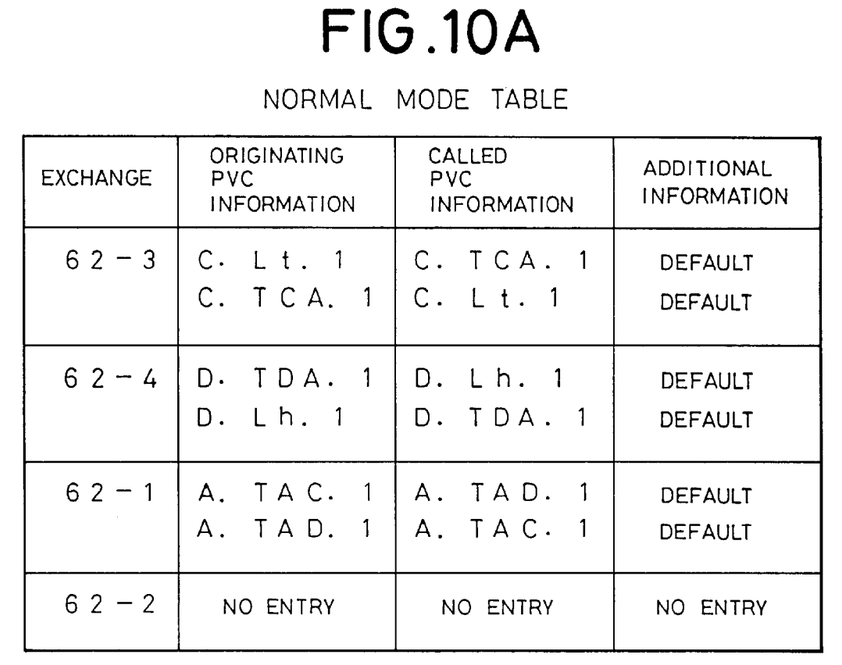
FIG. 10A is contents of a PVC switching information table in the normal mode of FIG. 6A when PVC is registered by individual exchanges.

Then, when PVCs are registered in individual exchanges, a table shown in FIG. 10A is used in the normal mode (state shown in FIG. 6A). Referring to FIG. 10A, the PVC switching information table in the exchange 62-3 (Exchange C) is registered with correspondence between originating PVC information "C. Lt. 1" and called PVC information "C. TCA. 1," as well as correspondence between originating PVC information "C. TCA. 1" and called PVC information "C. Lt. 1." In addition, the PVC switching information table in the exchange 62-4 (Exchange D) is registered with correspondence between originating PVC information "D. TDA. 1" and called PVC information "D. Lh. 1," as well as correspondence between originating PVC information "D. Lh. 1" and called PVC information "D. TDA. 1." Furthermore, the PVC switching information table in the exchange 62-1 (Exchange A) is registered with correspondence between originating PVC information "A. TAC. 1" and called PVC information "A. TAD. 1," as well as correspondence between originating PVC information "A. TAD. 1" and called PVC information "B. TAC. 1." All additional information are of default values. In addition, there is no entry in the PVC switching information table in the exchange 62-2 (Exchange B).

Figure 10B:
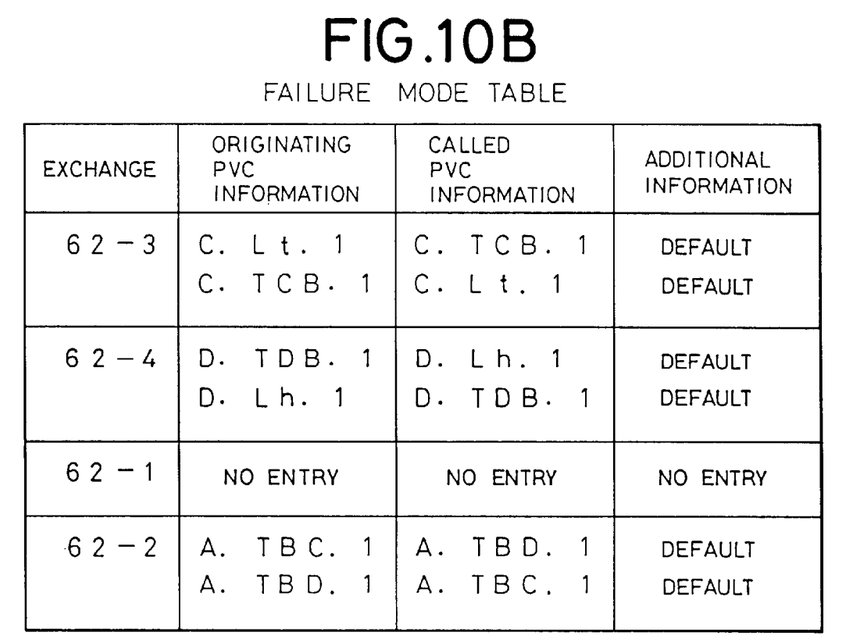
FIG. 10B is contents of a PVC switching information table in the failure mode of FIG. 6B when PVC is registered by individual exchanges.

In FIG. 10, "Lt," "Lh," "TAC," "TCA," "TAD," and "TDA" in the originating and called PVC information correspond to respective terminals of respective exchanges in FIG. 6. The operation of normal mode is implemented with such contents of registration, whereby PVC 60-1 in FIG. 6A are formed.

On the other hand, a table shown in FIG. 10B is used for the failure mode (state of FIG. 6B). Referring to FIG. 10B, the PVC switching information table in the exchange 62-3 (Exchange C) is registered with correspondence between originating PVC information "C. Lt. 1" and called PVC information "C. TCB. 1," as well as correspondence between originating PVC information "C. TCB. 1" and called PVC information "C. Lt. 1." In addition, the PVC switching information table in the exchange 62-4 (Exchange D) is registered with correspondence between originating PVC information "D. TDB. 1" and called PVC information "D. Lh. 1," as well as correspondence between originating PVC information "D. Lh. 1" and called PVC information "D. TDB. 1." Furthermore, the PVC switching information table in the exchange 62-2 (Exchange B) is registered with originating PVC information "A. TBC. 1" and called PVC information "A. TBD. 1," as well as correspondence between originating PVC information "A. TBD. 1" and called PVC information "B. TBC. 1." All additional information are of default values. There is no entry in the PVC switching information table in the exchange 62-1 (Exchange A).

The operation of failure mode is implemented with such contents of registration, whereby the PVC 60-2 in FIG. 6B is formed. In summary, the PVC switching information table shown in FIG. 10A is used in the normal operation, while the PVC switching information table shown in FIG. 10B is used in response to occurrence of failure. Then, when the tables are switched, the contents in both table are compared each other, and registration, addition or deletion of PVC as described above FIGS. 7 to 9 is performed for those entries which fail to match.

In this case, there is no entry in the PVC switching information table in the exchange 62-2 in FIG. 10A, while there is an entry in the PVC switching information table in the exchange 62-2 in FIG. 10B. Accordingly, a PVC corresponding to the content of the entry is added. In addition, there is an entry in the PVC switching information table in the exchange 62-1 in FIG. 10A, while there is no entry in the PVC switching information table in the exchange 62-1 in FIG. 10B. Accordingly, that PVC is deleted.

Switching from the normal mode to the failure mode as described above is performed in response to detection of failure. It is a matter of course that, even if no failure occurs, PVCs can be switched by forcibly changing a current table with manual operation from a maintenance terminal. This makes maintenance easy.

It may be also possible to provide a timer or the like, so that PVCs are switched by changing a current table in a predetermined period of time, or by changing a current table when a predetermined time of day is reached. This enables it to use a line with the lowest tariff for each time of day when the tariff differs from time to time for lines. In addition, when traffic capacity varies for lines from time to time, it is possible to use a line with the least traffic capacity at the time of day.

The above is description on a case where switching of PVC is implemented by registering in a PVC switching information table information for identifying originating and terminating terminals, and path information indicating connection paths between an originating terminal and a terminating terminal. Similarly, switching of PVC may be implemented with band information contained in additional information. In this case, registered in a PVC switching information table as additional information is band information indicating bands to be secured in data transfer between an originating terminal and a terminating terminal.

In general, in an ATM network, a band required for data transmission between terminals is secured by setting traffic parameters on PVC basis. In this case, bands are secured for traffic in a normal state and a peak state. The traffic parameters include peak cell rate (PCR) (cell/sec), cell delay variation (CDVT) (cell), sustainable cell rate (SCR) (cell/sec), burst tolerance (BT) (cell), and minimum cell rate (MCR) (cell/sec). Then, a band is secured by setting specific values to these parameters.

Furthermore, the above is description on a case where a PVC controls section with PVC switching information tables is provided in an ATM exchange. It is obvious that PVCs may be similarly switched by providing a switching control section in each terminal (maintenance terminal or the like). However, when the switching control section is provided on each terminal, a large number of PVC control commands are transmitted to the PVC control section in the exchange from the terminals, so that line traffic increases. Therefore, it is the best embodiment to provide the PVC switching control section in the ATM exchange as described above. Of course, if there arises no problem even if line traffic increases, the switching control section maybe provided on the terminal.

As described above, the present invention compares contents of a current table and a table newly becoming current, and performs connection, disconnection and change of path only for PVCs with modification in setting on PVC basis, so that it provides an advantage that the administrator can switch PVCs systematically and in batch at his/her discretion.

What is claimed is:

1. A PVC switching system for selectively using one of PVC information tables as a current table, and connecting an originating terminal and a terminating terminal according to content of said current table, each of the PVC information tables being recorded with originating and terminating correspondence information, said information containing information for identifying an originating terminal and a terminating terminal for each of those subject to switching a plurality of PVCs, each of PVC being a connection path fixed with an originating terminal and a terminating terminal, wherein said system comprises comparison means, in response to a switching command for comparing content of each entry in said current table and those in a table used after switching, and connection control means for, when there are entries for which the result of said comparison fails to match, disconnecting the connection path indicated by said entries, and connecting a connection path indicated by said entries in the table used after switching.

2. The PVC switching system claimed in claim 1, wherein an entry can be freely added to said PVC information table from outside.

3. The PVC switching system claimed in claim 1, wherein an entry can be freely deleted from said PVC information table.

4. The PVC switching system claimed in claim 1, wherein said originating and terminating correspondence information also contains information indicating a connection path between said originating terminal and said terminating terminal.

5. The PVC switching system claimed in claim 1, wherein said originating and terminating correspondence information also contains band information indicating a band to be secured in transferring data between said originating terminal and said terminating terminal.

6. The PVC switching system claimed in claim 1, wherein a plurality types of line operating modes are provided, content of each entry in said plurality of PVC information tables being set in correspondence to each mode.

7. The PVC switching system claimed in claim 2, wherein said addition of an entry is performed from a maintenance terminal.

8. The PVC switching system claimed in claim 3, wherein said deletion of an entry is performed from a maintenance terminal.

9. The PVC switching system claimed in claim 1, wherein comparison with said comparison means is performed by comparing originating PVC addresses in said current table and in said table used after switching.

10. The PVC switching system claimed in claim 1, wherein said switching command is input in every predetermined period of time.

11. An ATM exchange comprising the PVC switching system claimed in claim 1.

12. An ATM terminal comprising the PVC switching system claimed in claim 1.

13. The PVC switching system claimed in claim 1, wherein said comparison means performs comparison for connection, followed by comparison for disconnection, and wherein said connection control means performs connection and disconnection according to each comparison.

14. A PVC switching method for selectively using one of PVC information tables as a current table, and connecting an originating terminal and a terminating terminal according to content of said current table, each of the PVC information tables being recorded with originating and terminating correspondence information, said information containing information for identifying an originating terminal and a terminating terminal for each of those subject to switching a plurality of PVCs, each of PVC being a connection path fixed with an originating terminal and a terminating terminal, wherein said method comprises a first process, in response to a switching command for comparing content of each entry in said current table and those in a table used after switching, and a second process for, when there are entries for which the result of said comparison in first process fails to match, disconnecting the connection path indicated by said entries, and connecting a connection path indicated by said entries in the table used after switching.

15. The PVC switching method claimed in claim 14, wherein an entry can be freely added to said PVC information table from outside.

16. The PVC switching method claimed in claim 14, wherein an entry can be freely deleted from said PVC information table.

17. The PVC switching method claimed in claim 14, wherein said originating and terminating correspondence information also contains information indicating a connection path between said originating terminal and said terminating terminal.

18. The PVC switching method claimed in claim 14, wherein said originating and terminating correspondence information also contains band information indicating a band to be secured in transferring data between said originating terminal and said terminating terminal.

19. The PVC switching method claimed in claim 14, wherein a plurality types of line operating modes are provided, content of each entry in said plurality of PVC information tables being set in correspondence to each mode.

20. The PVC switching method claimed in claim 15, wherein said addition of an entry is performed from a maintenance terminal.

21. The PVC switching method claimed in claim 16, wherein said deletion of an entry is performed from a maintenance terminal.

22. The PVC switching method claimed in claim 14, wherein comparison with said first process is performed by comparing originating PVC addresses in said current table and in said table used after switching.

23. The PVC switching method claimed in claim 14, wherein said switching command is input in every predetermined period of time.

24. The PVC switching method claimed in claim 14, wherein said first process performs comparison for connection, followed by comparison for disconnection, and wherein said second process performs connection and disconnection according to each comparison.

* * * * *

UNITED STATES PATENT AND TRADEMARK OFFICE
CERTIFICATE OF CORRECTION

PATENT NO.   : 6,259,697 B1
DATED        : July 10, 2001
INVENTOR(S)  : Motoya Tatsukawa It is certified that error appears in the above-identified patent and that said Letters Patent is hereby corrected as shown below:

Column 2,
Line 35, delete "means,in" insert -- means, in --

Column 8,
Line 54, delete "(state of FIG. SB)" insert -- (state of FIG. 5B) --

Column 12,
Line 66, delete "maybe" insert -- may be --

Signed and Sealed this

Twenty-sixth Day of February, 2002

Attest:

Attesting Officer

JAMES E. ROGAN
Director of the United States Patent and Trademark Office